E. C. SHAW.
VEHICLE WHEEL RIM.
APPLICATION FILED JAN. 29, 1907.

1,009,347.

Patented Nov. 21, 1911.

WITNESSES:
Mary C. Hyatt
Oliver Williams

INVENTOR
Edwin Copland Shaw
BY Edward Davis
ATTORNEY

UNITED STATES PATENT OFFICE.

EDWIN COUPLAND SHAW, OF AKRON, OHIO, ASSIGNOR, BY MESNE ASSIGNMENTS, TO THE UNITED RIM COMPANY, OF AKRON, OHIO, A CORPORATION OF OHIO.

VEHICLE-WHEEL RIM.

1,009,347.  Specification of Letters Patent.  Patented Nov. 21, 1911.

Original application filed January 6, 1906, Serial No. 294,831. Divided and this application filed January 29, 1907. Serial No. 354,619.

*To all whom it may concern:*

Be it known that I, EDWIN COUPLAND SHAW, a citizen of the United States, residing in the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims adapted for use with tires of resilient material, and more particularly to rims having detachable portions so constructed that the tire may readily be attached and removed from the rim and yet when the detachable portion is in place the rim as a whole has substantially the strength of an integral rim and is capable of withstanding the great expansive force of the air confined in the tires (when the pneumatic form of tire is used) such as those used on even the heaviest automobiles and vehicles, and is capable of holding the tire firmly in place, in spite of the violent strains in impacts to which the rim and tire are subjected.

The present application is a division of my copending application, Serial No. 294831, filed January 6, 1906. In that application I have disclosed a rim having a detachable tire retaining flange and means for securing the said flange to the rim. I have claimed broadly therein means for securing the flange to the rim without the use of auxiliary locking devices such as bolts, nuts, latches, etc., the fastening means being integral respectively with the flange and rim. In the present application I do not claim anything claimed therein, but disclose a specific modification of such integral fastening means.

Figure 1:
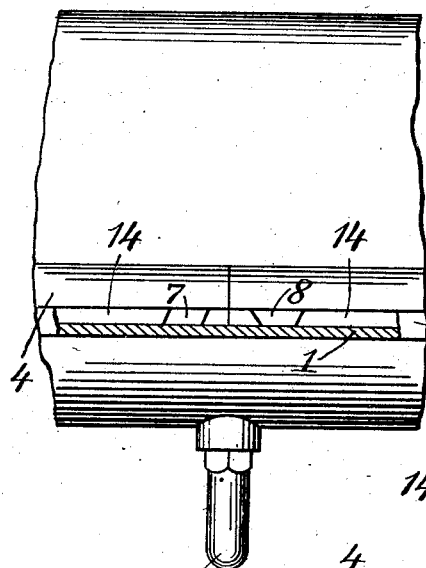
Figure 2:
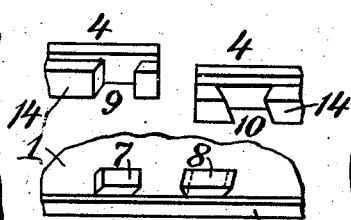
Figure 3:
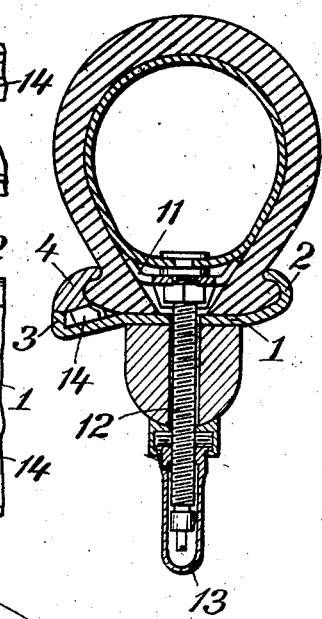
Figure 4:
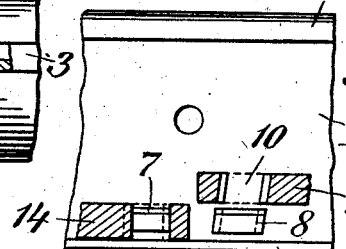
Figure 5:
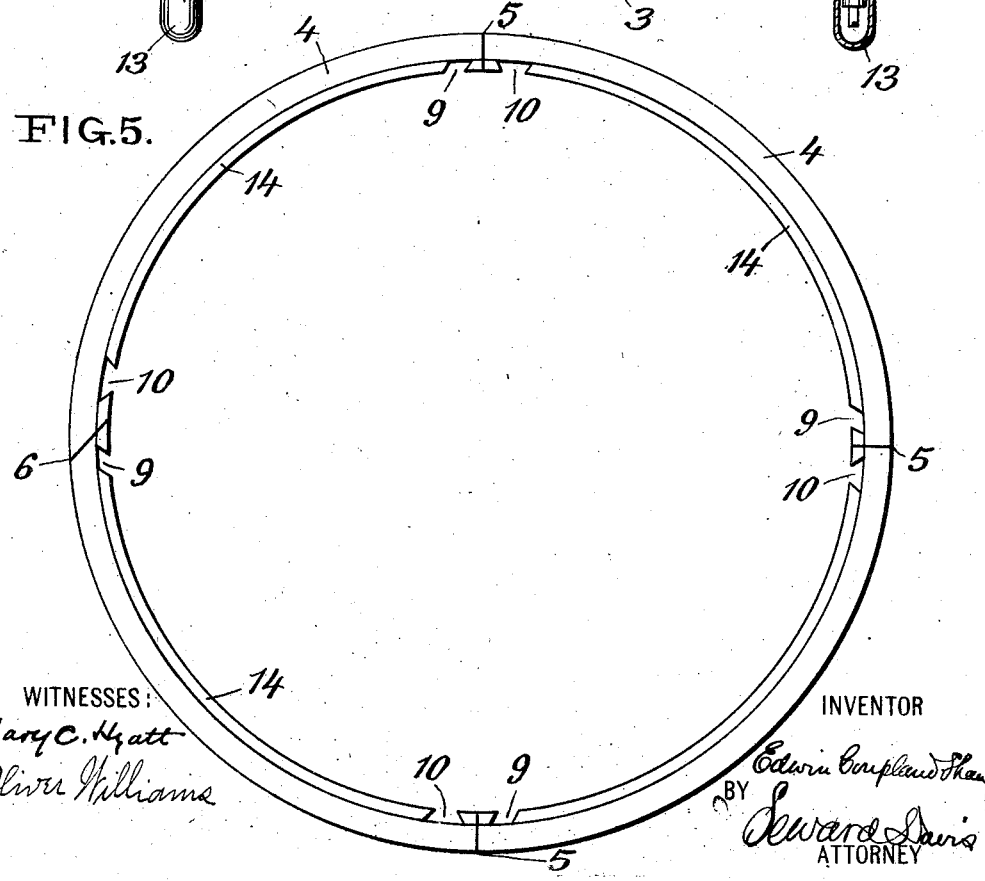

Referring to the drawings, Figure 1 shows a side elevation of a portion of a vehicle wheel rim, and tire, and a detachable flange equipped with my improved fastening means, a part being broken away to show details of construction. Fig. 2 is a perspective view of the ends of the detachable flange sections and of the rim, showing the details of the fastening means. Fig. 3 is a cross-section of a clencher tire and rim to which my improvements are applied showing the clip adapted to secure the tire and detachable flange in position. Fig. 4 is a plan view of the rim showing the lugs thereon, and sections of the terminals of the flange sections. Fig. 5 is a side view of the removable flange which is here constructed in four sections.

As shown particularly in Fig. 3, the rim proper or tire seating member 1 has one tire retaining flange 2 formed thereon in the usual manner, although if desired this also may be made detachable. In practice, however, this is usually found unnecessary. The opposite edge of the rim is inclined slightly downward and has its edge formed into an upturned flange 3, thus forming an annular groove or channel. The upper edge of this flange 3 is preferably on a level with or slightly below the main portion of the rim, in order to permit the tire to be easily slipped into and out of position. The removable tire flange is formed upon a removable transversely split ring 4, the base of which is formed to seat within the groove and to be held from laterally outward movement by the flange 3. I prefer to groove this ring to fit accurately against the flange 3. This rim may be split at one point or if desired, it may be constructed in several sections as shown in Fig. 5, in which case the fastening means hereinafter described are duplicated at the terminals of each of the sections. The ring may be split radially, as shown at 5, or may be scarf-jointed as shown at 6 or the ends may have any desired conformation. The fastening means consist of lugs 7 and 8, formed upon the rim at suitable points and slots or sockets 9 and 10 cut in the adjacent terminals of the split ring or of the sections thereof. These lugs and sockets are so constructed that when the detachable ring is forced outward into engagement with the flange 3 it is locked in position, but when one or both ends are forced inward, disengagement occurs. This may be accomplished in various ways, without departing from the spirit of my invention, but I have shown a construction which answers admirably. The lug 7 is rhomboidal, its end faces being inclined toward the lug 8. The slot 9 is similarly shaped so that when the lug is inserted in the slot and the adjacent terminal of the detachable ring is butted against it, disengagement cannot occur other than by an inward movement of the ring terminal. The lug 8 has its end faces undercut so that the lug is of dovetail shape and the corresponding slot 10 has a similar conformation. I prefer also to incline these end faces slightly inwardly and backwardly relatively to the adjacent lug so that when the ring terminal is drawn into engagement with the lug the said ring terminal will be gradually drawn toward the adjacent ring terminal.

The expansive force of the tire is usually found to be ample to secure the fastening means in engagement, but to guard against disengagement in the event of possible accidental deflation of the tire the clips ordinarily used with clencher tires will be found efficient. I simplify the construction by mounting a clip 11 upon the valve stem 12, so that when the dust-cap 13 is engaged with the valve stem and screwed up tightly the clip is wedged between the edges of the tire casing, firmly securing the ends of the removable ring from the inward movement necessary to disengage the fastening means.

The operation of my device is as follows: The parts being dismounted, the tire and tire casing are slipped over the flange 3 and placed into position upon the rim. The detachable ring is then sprung into place about the rim, the slot 9 being engaged with the lug 7. The adjacent ring terminal will then take a position just inside the lug 8. This end is then pulled outward toward the flange 3, the lug 8 entering the slot 10. The inclination of the faces of the lug 8 will gradually draw the ring terminal into engagement with the adjacent ring terminal. The tire is then inflated in the usual manner, firmly locking the parts in position. The clip if used is then drawn down into position preventing any possible disengagement. To remove the tire the operation is reversed. The tire is deflated, the clip if used, is loosened, whereupon one or both of the ring terminals may be forced inward and the lugs disengaged from the slots, which will permit the detachable ring and the tire to be removed. When the removable ring is constructed in sections as shown in Fig. 5, the mode of operation is very similar, the several sections being applied in rotation. In this event a clip may be used at each joint.

It is obvious that the form of these locking means may be varied greatly, and I do not wish to be understood as limiting myself to the precise construction which I have shown and described, but desire to cover the invention broadly as pointed out in the following claims.

1. Means for locking a removable cross-split tire flange to a vehicle wheel rim, comprising coöperating locking means formed integrally in the terminals of the said flange and upon the rim, substantially as set forth.

2. A detachable transversely split tire flange for use with vehicle wheel rims and locking means for securing said flange directly to the said rim, said locking means comprising a seat upon the rim, lugs extending upward from the rim and slots in the terminals of the tire flange adapted to receive and retain said lugs.

3. Means for locking a detachable tire flange to the main portion of a wheel rim comprising a slot in each terminal of the said flange and a lug integral with the main portion of the rim opposite each slot and adapted to coöperate therewith; one lug adapted to engage and disengage upon lateral movement of the ring terminal opposite thereto.

4. Means for securing a detachable transversely split tire flange to the main portion of a wheel rim comprising a retaining flange along the edge of said main portion, lugs projecting from said rim and slots in the terminals of said detachable flange adapted to coöperate with said lugs.

5. A removable flange for a wheel rim, consisting of a ring transversely split at several points and adapted to seat in a channel in the main portion of the rim, the ring being provided near and at each side of each point at which it is split, with means formed therein adapted to enter into locking engagement with corresponding means formed upon the main portion of the rim.

6. Means for locking the sections of a detachable tire flange to the main portion of a wheel rim comprising a retaining flange, longitudnally inclined lugs, dove-tail shaped lugs and slots in section terminals adapted to engage with said lugs, substantially as set forth.

7. Means for locking a detachable cross-split tire flange to the main portion of a wheel rim comprising a retaining flange along the edge of said main portion, a longitudinally inclined lug and a dove-tail shaped lug formed upon said main portion and slots in the terminals of said split ring each adapted to enter into locking engagement with one of said lugs.

8. Means for securing a removable cross-split tire flange to a wheel rim comprising a lug extending upwardly from the rim, having its end faces undercut, a second lug extending upwardly from the rim, having its end faces inclined toward the other lug, and a slot in each terminal of the tire flange adapted to engage with one of said lugs.

9. In a wheel rim, a tire seating member, a removable split flange, projections upon the seating member, engaging recesses in the flange, said projections and recesses being constructed and arranged to lock the parts in wedging engagement.

EDWIN COUPLAND SHAW.

Witnesses:
OLIVER WILLIAMS,
SEWARD DAVIS.